United States Patent
Hama

(10) Patent No.: US 7,207,432 B2
(45) Date of Patent: Apr. 24, 2007

(54) LINEAR MOTION DRIVE SYSTEM AND RAIL HOLDER

(75) Inventor: Tomio Hama, Okaya (JP)

(73) Assignee: Yugen Kaisha Hama International, Nagano (JP)

( * ) Notice: Subject to any disclaimer, the term of this patent is extended or adjusted under 35 U.S.C. 154(b) by 273 days.

(21) Appl. No.: 10/941,980

(22) Filed: Sep. 16, 2004

(65) Prior Publication Data

US 2005/0063625 A1    Mar. 24, 2005

(30) Foreign Application Priority Data

Sep. 18, 2003  (JP)  ............... 2003-326784

(51) Int. Cl.
*F16C 35/00*   (2006.01)
(52) U.S. Cl. ............... 198/750.1; 198/861.1; 384/40
(58) Field of Classification Search ............ 198/750.1, 198/861.1; 384/40
See application file for complete search history.

(56) References Cited

U.S. PATENT DOCUMENTS

| | | | | |
|---|---|---|---|---|
| 4,339,031 A | * | 7/1982 | Densmore | 198/861.2 |
| 4,856,415 A | * | 8/1989 | Noda | 92/88 |
| 5,074,678 A | * | 12/1991 | Eberle | 384/49 |
| 5,568,982 A | * | 10/1996 | Stoll et al. | 384/55 |
| 5,690,431 A | * | 11/1997 | Schon | 384/15 |
| 6,116,810 A | | 9/2000 | Eberle | |
| 6,158,123 A | * | 12/2000 | Bryson | 29/898.03 |
| 6,179,468 B1 | * | 1/2001 | Thorstens et al. | 384/40 |
| 6,435,719 B1 | * | 8/2002 | Riedel et al. | 384/15 |
| 6,485,178 B1 | * | 11/2002 | Koban | 384/39 |
| 6,499,588 B1 | * | 12/2002 | Eberle | 198/861.2 |
| 6,679,631 B2 | * | 1/2004 | Iida | 384/58 |

FOREIGN PATENT DOCUMENTS

| | | |
|---|---|---|
| DE | 38 42 627 A1 | 6/1990 |
| DE | 196 15 465 A1 | 10/1997 |
| EP | 0 406 647 A2 | 1/1991 |
| JP | 2001-263348 A | 9/2001 |

* cited by examiner

*Primary Examiner*—Douglas Hess
(74) *Attorney, Agent, or Firm*—Birch, Stewart, Kolasch & Birch, LLP

(57) ABSTRACT

The linear motion drive system is capable of optionally changing a position of a linear rail with respect to a pedestal. The linear motion drive system comprises: a pedestal section; a linear rail arranged in parallel with respect to the pedestal section; a rail holder attached to the pedestal section, the rail holder holding the linear rail on the pedestal section; and a moving body linearly reciprocally moving along the linear rail. The rail holder is slidably attached to and fixed to the pedestal section by an attaching mechanism so as to optionally change a position of the rail holder with respect to the pedestal section.

9 Claims, 3 Drawing Sheets

LINEAR MOTION DRIVE SYSTEM AND RAIL HOLDER

This Non-provisional application claims priority under 35 U.S.C. § 119(a) on Patent Application No(s). 2003-326784 filed in Japan on Sep. 18, 2003, the entire contents of which are hereby incorporated by reference.

BACKGROUND OF THE INVENTION

The present invention relates to a linear motion drive system and a rail holder, more precisely relates to a linear motion (hive system, in which a moving body linearly reciprocally moves along a rail, and a rail holder for holding the rail.

One of conventional linear motion drive systems is disclosed in Japanese Patent Gazette No. 2001-263348. In the linear motion drive system, a linear rail is attached to a pedestal section by an attachment. The attachment is fixed to a pedestal section of the drive system. A plurality of through-holes are bored in the linear rail, and they are arranged in the longitudinal direction thereof with suitable separations. The attachment also has through-holes. Bolts are pierced through the through-holes of the linear rail and the attachment so as to fix the linear rail on the attachment. A moving body linearly moves along the linear rail.

When the linear rail is attached to the attachment, firstly the through-holes of the linear rail are corresponded to the through-holes of the attachment. Separation between the through-holes of the attachment is equal to that of the linear rail. Then, the bolts are respectively pierced through the through-holes of the both members, and nuts are respectively screwed with the bolts so that the linear rail can be fixed to the attachment, which has been fixed to the pedestal section.

In the above described drive system, the position of the linear rail with respect to the pedestal section is limited by the separations of the through-holes of the both members. Even if the position of the linear rail must be changed due to change of design, precise adjustment of the position of the linear rail, etc., the position of the linear rail cannot be optionally changed.

SUMMARY OF THE INVENTION

The present invention was invented to solve the problem of the conventional linear motion drive system.

An object of the present invention is to provide a linear motion drive system, which is capable of optionally changing a position of a linear rail with respect to a pedestal section.

Another object is to provide a rail holder for the linear motion drive system of the present invention.

To achieve the objects, the present invention has following structures.

Namely, the linear motion drive system of the present invention comprises:

an elongated pedestal section;

a linear rail being arranged in parallel with respect to the pedestal section;

a rail holder being attached to the pedestal section, the rail holder holding the linear rail on the pedestal section; and a moving body linearly reciprocally moving along the linear rail, wherein the rail holder is slidably attached to and fixed to the pedestal section by an attaching mechanism so as to optionally change a position of the rail holder with respect to the pedestal section.

With this structure, the rail holder is slidably attached to and fixed to the pedestal section by the attaching mechanism, so that the position of the rail holder holding the linear rail can be optionally changed.

In the linear motion drive system, a plurality of the rail holders, each of which is shorter than the linear rail, may be employed to hold the linear rail.

With this structure, the rail holders can be freely arranged. Therefore, the position of the rail holder holding the linear rail can be further freely changed. In the linear motion drive system, a plurality of first through-holes may be formed in the rail holder and arranged in the longitudinal direction thereof, a plurality of rail holes, whose separation is equal to that of the first through-holes, may be formed in the linear rail and arranged in the longitudinal direction thereof, and the linear rail may be fixed to the rail holder by bolts, which are pierced through the first through-holes and the rail holes.

With this structure, the position of the rail holder with respect to the linear rail can be selectively changed.

In the linear motion drive system, the pedestal section may have an adjust groove having an inner part and an opening part, width of the inner part is wider than that of the opening part, the rail holder may have a second through-hole, and
the attaching mechanism may include:
a bolt piercing through the second through-hole and entering the adjust groove; and
a nut being provided in the adjust groove and engaging therewith, the nut being screwed with the bolt so as to detachably attach the rail holder to the pedestal section.

Further, in the linear motion drive system, according to claim 4, one side face of the rail holder may be a slope face so as to gradually make sectional width of the rail holder narrower from a seating face, which contacts the pedestal section, to a top end, at which a support section for supporting the linear rail is formed, and the second through-hole may be formed in the slope face and the seating face of the rail holder.

With these structures, the pedestal section and the rail holder can be simplified.

On the other hand, the rail holder, which is provided between a pedestal section and a linear rail so as to attach the linear rail to and arrange the same in parallel with respect to the pedestal section, is characterized in, that the rail holder is slidably attached and fixed to the pedestal section by an attaching mechanism so as to optionally change a position of the rail holder with respect to the pedestal section.

With this structure, the rail holder is slidably attached to and fixed to the pedestal section by the attaching mechanism, so that the position of the rail holder holding the linear rail can be optionally changed.

In the rail holder, the pedestal section may have an adjust groove having an inner part and an opening part, width of the inner part is wider than that of the opening part, the rail holder may have a second through-hole, and
the attaching mechanism may include:
a bolt piercing through the second through-hole and entering the adjust groove; and a nut being provided in the adjust groove and engaging therewith, the nut being screwed with the bolt so as to detachably attach the rail holder to the pedestal section.

Further, in the rail holder, one side face of the rail holder may be a slope face so as to gradually make sectional width of the rail holder narrower from a seating face, which contacts the pedestal section, to a top end, at which a support section for supporting the linear rail is formed, and the second through-hole may be formed in the slope face and the seating face of the rail holder.

With these structures, the pedestal section and the rail holder can be simplified.

As described above, in the present invention, the position of the rail holder holding the linear rail, with respect to the pedestal section, can be optionally changed.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

Figure 1:
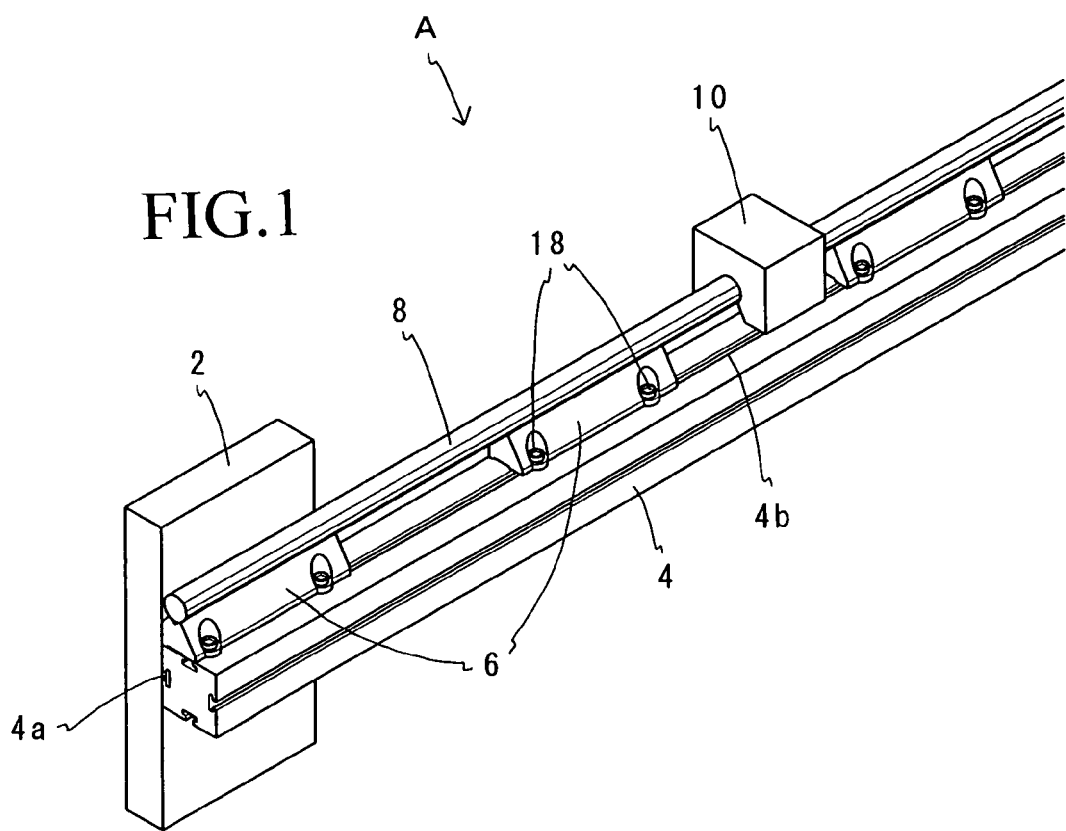
FIG. 1 is a partial perspective view of a linear motion drive system of an embodiment of the present invention.
Figure 2:
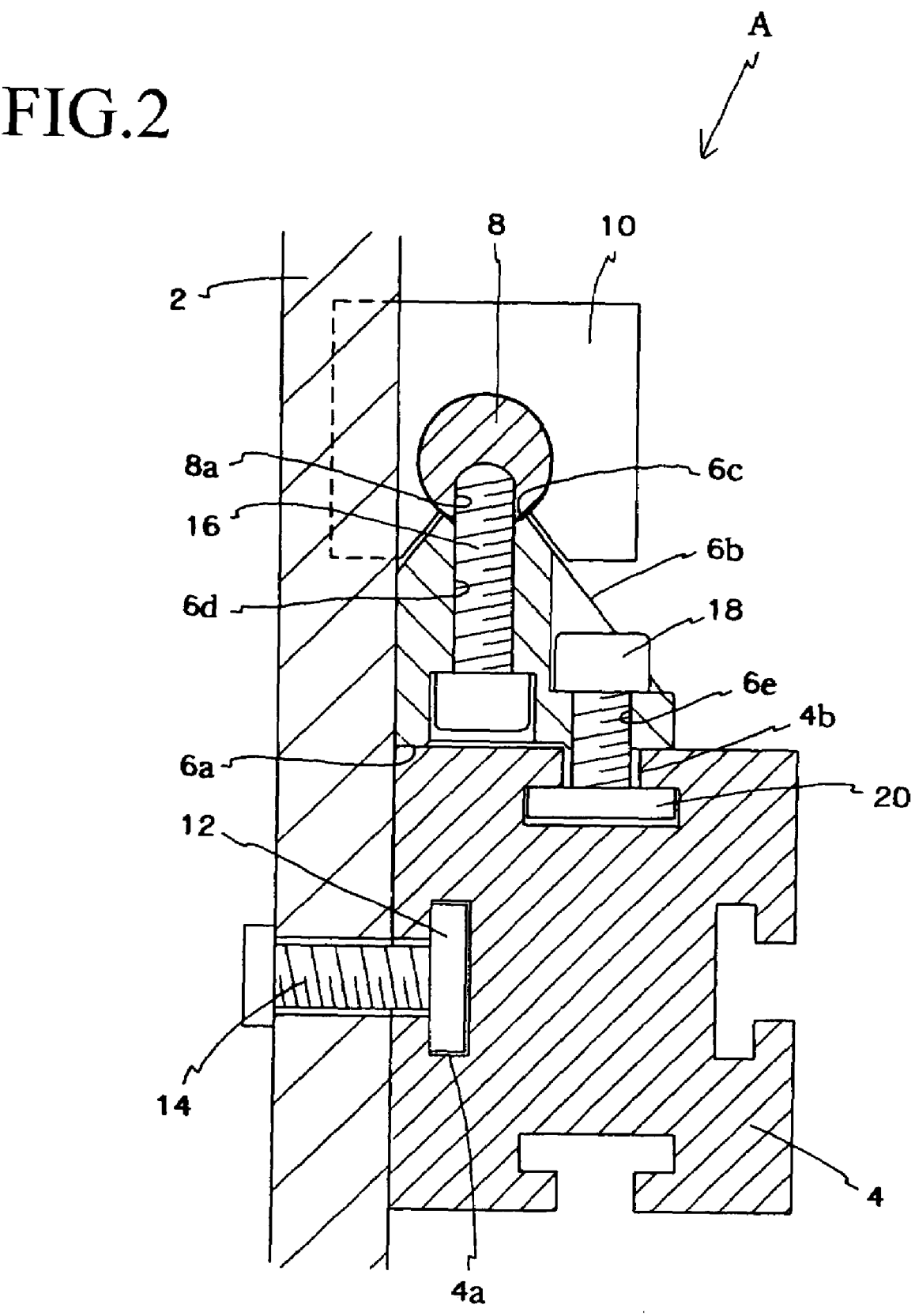
FIG. 2 is a sectional view of the linear motion drive system.

FIG. 1 is a partial perspective view of a linear motion drive system of the present embodiment, and FIG. 2 is a sectional view of the linear motion drive system.

As shown in FIG. 1, the linear motion drive system "A" comprises: a pedestal section 4 fixed to the base 2; a plurality of rail holders 6 attached to the pedestal section 4; a linear rail 8 fixed to the rail holders 6; and a moving body 10 linearly reciprocally moving on the linear rail 8. Note that, number of the rail holders 6 may be one or more.

The linear motion drive system "A" is installed on bases 2. The pedestal section 4 is fixed on the bases 2. Note that, one of the bases 2 is shown in FIG. 1. The linear motion drive system "A" is employed in, for example, an unloading unit of a resin molding machine, which takes molded products out from a molding die. In that case, the base 2 is a frame of the resin molding machine or one table of an X-Y table, which moves in the direction perpendicular to the moving direction of the moving body 10 so as to convey molded products. The pedestal 4 is fixed to the base or bases 2. A chucking unit for chucking a molded product may be provided to the moving body 10.

As shown in FIG. 1, the pedestal 4 is formed into an elongated rectangular block, and its ends are respectively fixed to the bases 2. Further, as shown in FIG. 2, adjust grooves 4a and 4b, which have T-shaped sectional shapes, are formed in side faces of the pedestal section 4. The adjust grooves 4a and 4b are extended in the longitudinal direction of the pedestal section 4. Each of the adjust grooves 4a and 4b has an inner part and an opening part, and width of the inner part is wider than that of the opening part.

A nut 12, whose diameter is greater than the width of the opening part of the adjust groove 4a, is loosely fitted in the inner part of the adjust groove 4a. A bolt 14 is pierced through the base 2 and screwed with the nut 12. With this structure, each end of the pedestal 4 is fixed to the base 2. Means for fixing the pedestal section 4 to the bases 2 is not limited to the bolts and nuts. Other means may be employed. Further, the bases 2 and the pedestal section 4 may be integrally formed.

In the present embodiment, a plurality of the rail holders 6, whose length is shorter than that of the linear rail 8, are serially arranged in the longitudinal direction of the pedestal section 4 so as to hold the linear rail 8 (see FIG. 1). As shown in FIG. 2, a bottom face 6a of each rail holder 6 is a seating face, which contacts the pedestal section 4. A side face 6b of each rail holder 6 is formed into a slope face so as to gradually make sectional width of the rail holder 8 narrower from the seating face 6a to a top end. At the top end of the rail holder 6, a support section 6c for supporting the linear rail 8 is formed. A sectional shape of the support section 6c is formed into a V-shape, so that the linear rail 8 can be supported thereon.

Figure 5:
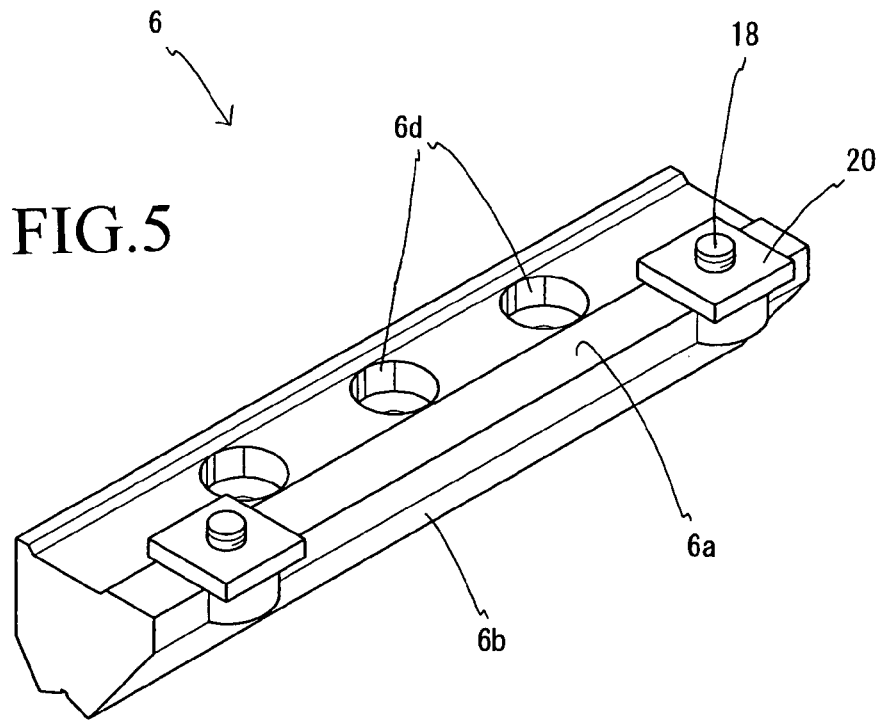
FIG. 5 is a perspective view of the inverted rail holder.
Figure 3:
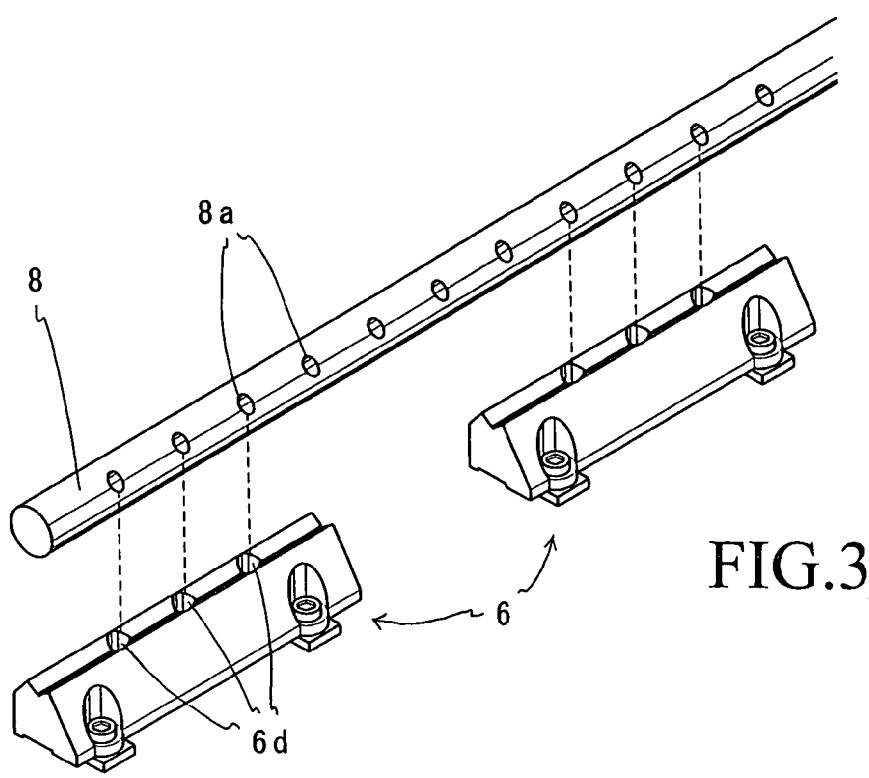
FIG. 3 is an explanation view of a linear rail and rail holders.
Figure 4:
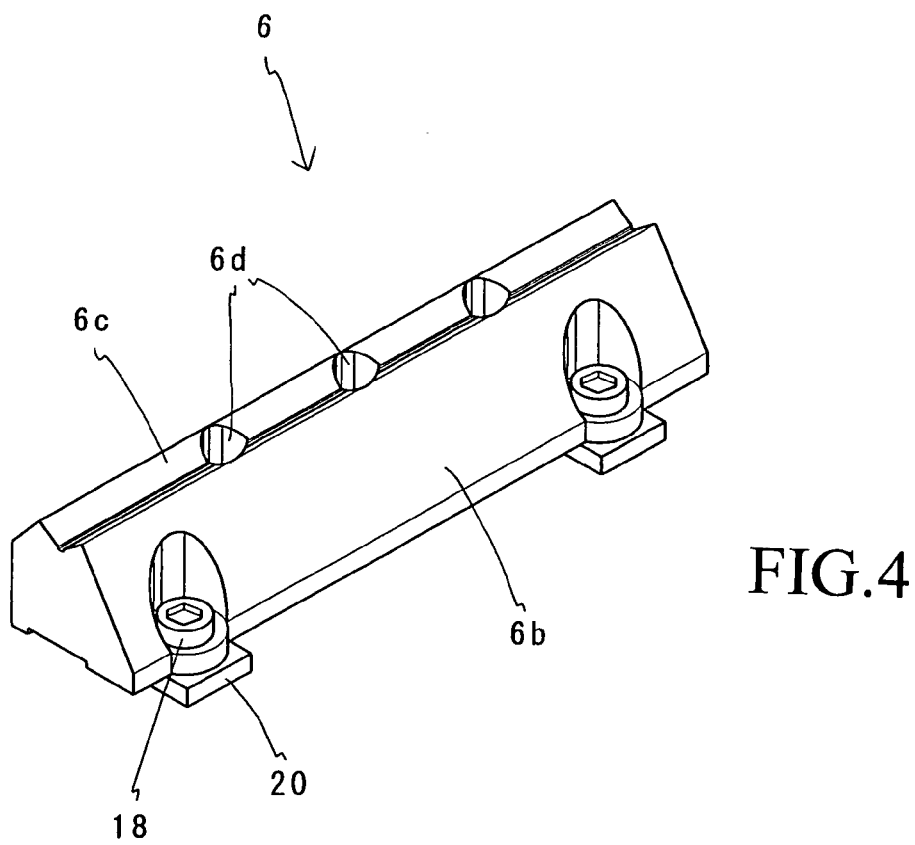
FIG. 4 is a perspective view of the rail holder.

As shown in FIGS. 2, 4 and 5, a plurality of first through-holes 6d, each of which communicates the seating face 6a to the support section 6c, are formed in each rail holder 6. A plurality of rail holes 8a, which are not through-holes, are formed in the linear rail 8 and serially arranged in the longitudinal direction thereof with regular separations (see FIG. 3). Female screws are formed in inner circumferential faces of the rail holes 8a.

The linear rail 8 is fixed to the rail holders 6 by bolts 16. Each bolt 16 is pierced through the first through-holes 6s of the rail holder 6 and screwed with the female screw of each rail hole 8a (see FIG. 2). With this structure, the linear rail 8 is fixed to the rail holders 6.

Two second through-holes 6e are formed in each rail holder 6 so as to detachably attach each rail holder 6 to the pedestal section 4. Each second through-hole 6e communicates the seating face 6a to the slope face 6b.

Nuts 20, whose diameters are greater than the width of the opening part of the adjust groove 4b, are loosely fitted in the inner part of the adjust groove 4b. Bolts 18 are respectively pierced through the second through-holes 6e and screwed with the nuts 20 (see FIG. 2). With this structure, each rail holder 6 is fixed to the pedestal section 4. Note that, by loosening the bolts 18 and nuts 20, each rail holder 6 can slide on the pedestal section 4 in the longitudinal direction thereof.

A method of attaching the linear rail 8 to the pedestal section 4 will be explained. Firstly, the rail holders 6 are attached to the linear rail 8, by the bolts 16, with suitable separations. The separations between the rail holders 6 may be determined according to load applied from the moving body 10 to the linear rail 8. If the load is greater, the separations are narrower. Next, the bolts 18 are pierced through the second through-holes 6e of the rail holders 6, and the nuts 20 are loosely screwed with the bolts 18. Then, the nuts 20 are inserted into the adjust groove 4b from one end. When the linear rail 8 is located at a desired position, the bolts 18 are tightly screwed with the nuts 20, so that the rail holders 6 can be fixed along edges of the opening part of the adjust groove 4b. By these steps, the linear rail 8 can be fixed to the pedestal section 4 together with the rail holders 6.

When the position of the linear rail 8 is changed, the bolts 18 are loosened. By loosening the bolts 18, the rail holders 6 can be moved along the adjust groove 4b together with the linear rail 8.

Therefore, in the linear motion drive system "A" of the present embodiment, the position of the linear rail 8 can be linearly moved along the adjust groove 4b. In the conventional linear motion drive system, change of the position of the linear rail is limited. On the other hand, in the present embodiment, the position of the linear rail 8 can be easily, precisely and optionally changed when the position thereof must be changed due to adjustment, maintenance, change of design, etc. Further, the pedestal section 4 is also fixed to the bases 2 by the bolts 14 and the nuts 12 engaged with the adjust groove 4a. A position of the pedestal section 4 with respect to the bases 2 can be optionally changed. Therefore, the pedestal section 4 can be freely, precisely and optionally provided as well as the rail holders 6.

In the above described embodiment, the linear rail 8 is fixed to the rail holders 6 by the bolts 16, which are pierced from the seating faces 6a, but the fixing structure is not limited to the embodiment. For example, as far as the linear motion of the moving body 10 is not interfered, the rail holes 8a of the linear rail 8 may be through-holes, female screws may be formed in inner circumferential faces of the first-through holes 6d, and the bolts 16 may be pierced through the rail through-holes 8a so as to integrate the linear rail 8 with the rail holders 6. In this case, positions of the rail holders 6 with respect to the linear rail 8 can be easily changed without detaching the rail holders 6 from the pedestal section 4. The linear motion drive system "A" can be applied to not only the resin molding machine but also many machines and systems.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A linear motion drive system, comprising:
an elongated pedestal section;
a linear rail being arranged in parallel with respect to said pedestal section;
a rail holder being attached to said pedestal section, said rail holder holding said linear rail on said pedestal section; and
a moving body linearly reciprocally moving along said linear rail,
wherein said rail holder is slidably attached to and fixed to said pedestal section by an attaching mechanism so as to optionally change a position of said rail holder with respect to said pedestal section,
a plurality of first through-holes are formed in said rail holder and arranged in the longitudinal direction thereof,
a plurality of rail holes, whose separation is equal to that of the first through-holes, are formed in said linear rail and arranged in the longitudinal direction thereof, and
said linear rail is fixed to said rail holder by bolts, which are pierced through the first through-holes and the rail holes.

2. The linear motion drive system according to claim 1, wherein a plurality of said rail holders, each of which is shorter than said linear rail, hold said linear rail.

3. The linear motion drive system according to claim 1, wherein said pedestal section has an adjust groove having an inner part and an opening part, width of the inner part is wider than that of the opening part,
said rail holder has a second through-hole, and
said attaching mechanism includes:
a bolt piercing through the second through-hole and entering the adjust groove; and
a nut being provided in the adjust groove and engaging therewith, the nut being screwed with the bolt so as to detachably attach said rail holder to said pedestal section.

4. The linear motion drive system according to claim 3, wherein one side face of said rail holder is formed into a slope face so as to gradually make sectional width of said rail holder narrower from a seating face, which contacts said pedestal section, to a top end, at which a support section for supporting said linear rail is formed, and
the second through-hole is formed in the slope face and the seating face of said rail holder.

5. A rail holder, which is provided between a pedestal section and a linear rail so as to attach said linear rail to and arrange the same in parallel with respect to said pedestal section,
wherein said pedestal section has an adjust groove having an inner part and an opening part, width of the inner part is wider than that of the opening part, and
comprising an attaching mechanism including:
a bolt piercing through a through-hole of said rail holder and entering the adjust groove; and
a nut being provided in the adjust groove and engaging therewith, the nut being screwed with the bolt so as to detachably attach said rail holder to said pedestal section,
wherein said rail holder is slidably attached and fixed to said pedestal section by said attaching mechanism so as to optionally change a position of said rail holder with respect to said pedestal section.

6. The rail holder according to claim 5,
wherein one side face of said rail holder is formed into a slope face so as to gradually make sectional width of said rail holder narrower from a seating face, which contacts said pedestal section, to a top end, at which a support section for supporting said linear rail is formed, and
the second through-hole is formed in the slope face and the seating face of said rail holder.

7. A linear motion drive system, comprising:
an elongated pedestal section;
a linear rail being arranged in parallel with respect to said pedestal section;
a rail holder being attached to said pedestal section, said rail holder holding said linear rail on said pedestal section; and
a moving body linearly reciprocally moving along said linear rail,
wherein said pedestal section has an adjust groove having an inner part and an opening part, width of the inner part is wider than that of the opening part,
said rail holder has a through-hole, and
an attaching mechanism including:
a bolt piercing through the through-hole and entering the adjust groove; and a nut being provided in the adjust groove and engaging therewith, the nut being screwed with the bolt so as to detachably attach said rail holder to said pedestal section, wherein said rail holder is slidably attached and fixed to said pedestal section by said attaching mechanism so as to optionally change a position of said rail holder with respect to said pedestal section.

8. The linear motion drive system according to claim 7, wherein a plurality of said rail holders, each of which is shorter than said linear rail, hold said linear rail.

9. The linear motion drive system according to claim 7,
wherein one side face of said rail holder is formed into a slope face so as to gradually make sectional width of said rail holder narrower from a seating face, which contacts said pedestal section, to a top end, at which a support section for supporting said linear rail is formed, and the through-hole is formed in the slope face and the seating face of said rail holder.

* * * * *